United States Patent
Anderson, Sr.

(10) Patent No.: US 11,474,562 B1
(45) Date of Patent: Oct. 18, 2022

(54) MOBILE PHONE HOLDER FOR APPENDAGE AND METHOD OF USE

(71) Applicant: Gerald R. Anderson, Sr., Richmond, TX (US)

(72) Inventor: Gerald R. Anderson, Sr., Richmond, TX (US)

( * ) Notice: Subject to any disclaimer, the term of this patent is extended or adjusted under 35 U.S.C. 154(b) by 0 days.

(21) Appl. No.: 17/381,671

(22) Filed: Jul. 21, 2021

Related U.S. Application Data

(63) Continuation-in-part of application No. 29/794,976, filed on Aug. 9, 2021, now abandoned.

(51) Int. Cl.
| | | |
|---|---|---|
| *G06F 1/16* | (2006.01) | |
| *A45F 5/10* | (2006.01) | |
| *H04M 1/12* | (2006.01) | |
| *A45F 5/00* | (2006.01) | |

(52) U.S. Cl.
CPC ............... *G06F 1/163* (2013.01); *A45F 5/10* (2013.01); *H04M 1/12* (2013.01); *A45F 2005/008* (2013.01)

(58) Field of Classification Search
CPC ...... G06F 1/163; A45F 5/10; A45F 2005/008; H04M 1/12
See application file for complete search history.

(56) References Cited

U.S. PATENT DOCUMENTS

| | | | | |
|---|---|---|---|---|
| 2,449,324 A | * | 9/1948 | Robinson ................ | A45F 5/00 D11/4 |
| 3,826,407 A | * | 7/1974 | Keating ................ | A45D 44/00 224/932 |
| 8,662,362 B1 | * | 3/2014 | Bastian ................ | H04B 1/385 248/205.2 |
| 9,204,709 B2 | * | 12/2015 | Paulsen ................ | A61M 16/16 |
| 9,568,141 B1 | * | 2/2017 | Zaloom ................ | F16M 13/00 |
| 9,661,912 B1 | * | 5/2017 | Chung ................ | A45F 5/00 |
| 10,085,544 B2 | * | 10/2018 | Schessel ................ | A45F 5/00 |
| 10,226,117 B1 | * | 3/2019 | Baxter ................ | F16M 13/04 |
| 10,519,991 B2 | * | 12/2019 | Saculles ................ | F16M 11/041 |
| 2003/0213822 A1 | * | 11/2003 | Lautner ................ | A44C 5/0007 224/221 |
| 2008/0178977 A1 | * | 7/2008 | Nauman ................ | A45F 5/00 150/144 |
| 2008/0190974 A1 | * | 8/2008 | Finn ................ | A45F 5/00 224/267 |
| 2009/0044821 A1 | * | 2/2009 | Hatala ................ | G01C 9/28 132/214 |
| 2009/0044825 A1 | * | 2/2009 | Lawrence ................ | A45F 5/00 206/581 |
| 2010/0301079 A1 | * | 12/2010 | John ................ | A45F 5/00 224/269 |
| 2012/0207464 A1 | * | 8/2012 | Sherwood ................ | F16M 13/04 396/428 |
| 2013/0235546 A1 | * | 9/2013 | Sedillo ................ | A45F 5/00 361/809 |

(Continued)

*Primary Examiner* — Lewis G West
(74) *Attorney, Agent, or Firm* — Leavitt Eldredge Law Firm

(57) ABSTRACT

A mobile phone holder that mounts a mobile phone on an appendage such as a limb of a user, an arm of a chair, and the like is disclosed. The mobile phone holder comprises of a cradle having a first arm and a second arm; an elongated member; and a supporter having a first curved member and a second curved member.

1 Claim, 4 Drawing Sheets

(56) References Cited

U.S. PATENT DOCUMENTS

| | | | | |
|---|---|---|---|---|
| 2014/0340997 | A1* | 11/2014 | Rahman | G09G 3/2096 368/10 |
| 2015/0164205 | A1* | 6/2015 | Vales | H04B 1/3888 224/219 |
| 2015/0189150 | A1* | 7/2015 | Morisawa | H04N 21/41265 348/211.8 |
| 2015/0189753 | A1* | 7/2015 | Goyal | H05K 1/148 29/830 |
| 2016/0070339 | A1* | 3/2016 | Crawford | G06F 3/011 345/156 |
| 2016/0070393 | A1* | 3/2016 | Sharma | A61B 5/7475 345/174 |
| 2016/0129310 | A1* | 5/2016 | Ahmed | G16H 40/63 600/508 |
| 2016/0183667 | A1* | 6/2016 | MacColl | A45F 5/00 224/222 |
| 2016/0202724 | A1* | 7/2016 | Chang | G06F 3/017 345/156 |
| 2016/0209920 | A1* | 7/2016 | Mastandrea | G06F 3/014 |
| 2016/0349790 | A1* | 12/2016 | Connor | G06F 3/017 |
| 2019/0052740 | A1* | 2/2019 | Ormsbee | H04M 1/04 |
| 2019/0116966 | A1* | 4/2019 | Gregory | A45F 5/00 |
| 2019/0310713 | A1* | 10/2019 | Wang | G06F 3/0393 |
| 2020/0359774 | A1* | 11/2020 | Caine | F16M 11/28 |

\* cited by examiner

MOBILE PHONE HOLDER FOR APPENDAGE AND METHOD OF USE

CROSS REFERENCE TO RELATED APPLICATIONS

This application claims the benefit of U.S. Design application Ser. No. 29/794,976, filed Jun. 16, 2021, of which is hereby incorporated by reference in its entirety.

BACKGROUND

1. Field of the Invention

The present invention relates generally to mobile phone holders, and more specifically to a mobile phone holder that mounts on an appendage such as a limb of a user, an arm of a chair, and the like to allow for handsfree use of a mobile phone.

2. Description of Related Art

The use of mobile phones has dramatically increased over the last decade. A large majority of the population utilize mobile phones for various reasons from checking emails and texts to receiving driving directions. As mobile phone technology advanced, users became able to view videos, movies, and other media on their mobile phones for work or entertainment purposes.

One of the problems commonly associated with this is that users are often required to hold their mobile device in their hands in order to have a proper view of the media. This is inconvenient and can lead to hand fatigue. While mobile phone holders have been developed to provide for handsfree use of mobile phones, innovation has primarily focused on car mounts to provide safety and convenience for users while driving. Hence, it would be advantageous to have a mobile phone holder that allows a user to view media through a mobile phone handsfree, thereby enabling the user to use his or her hands for other tasks and eliminating hand fatigue associated with holding mobile phones.

Accordingly, although great strides have been made in the area of mobile phone holders, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
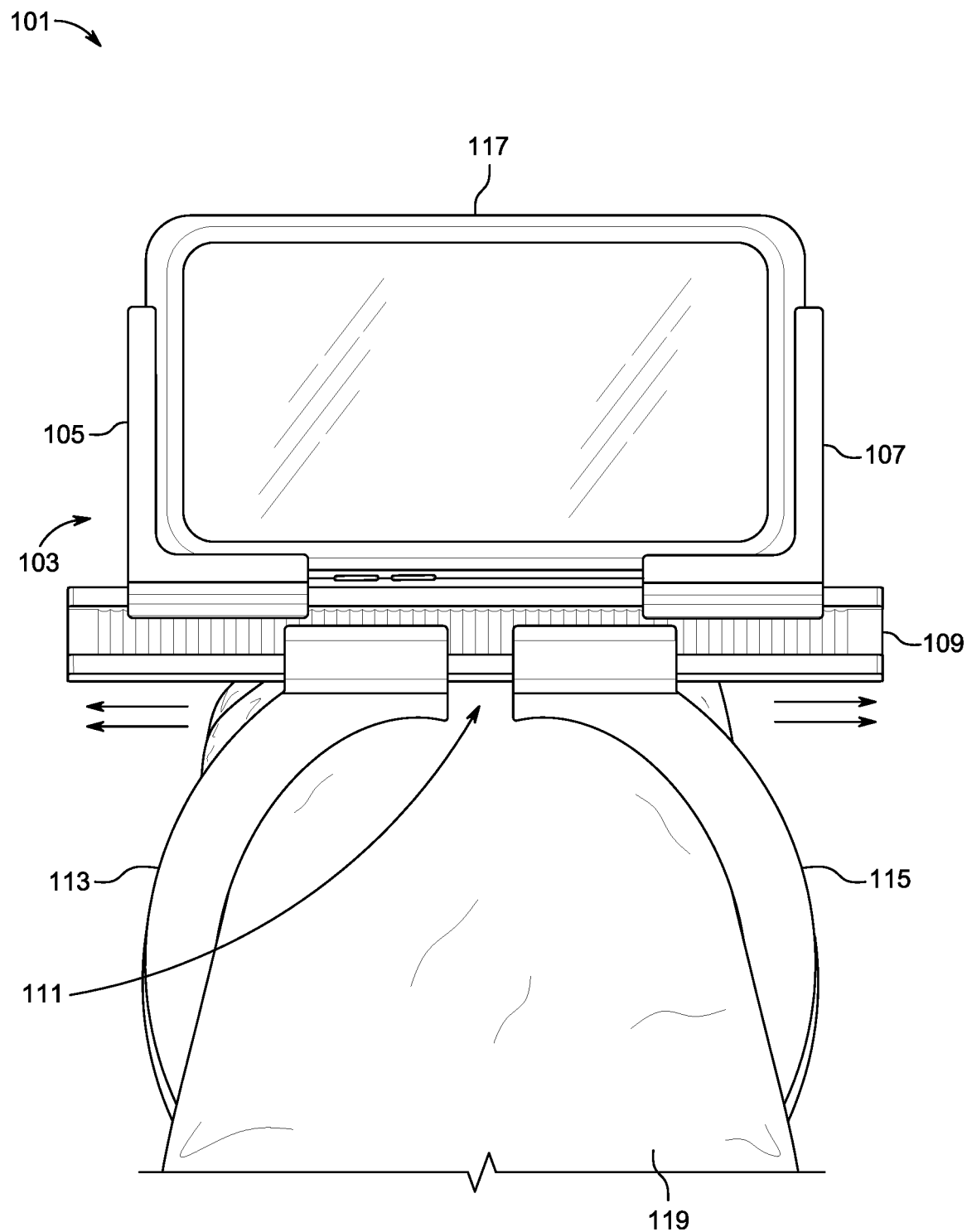
FIG. 1A is a front view of a mobile phone holder mounted on an appendage in accordance with a preferred embodiment of the present invention that is retaining a mobile phone in a landscape orientation.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional mobile phone holders. Specifically, the present invention provides for handsfree viewing of media on a mobile phone. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
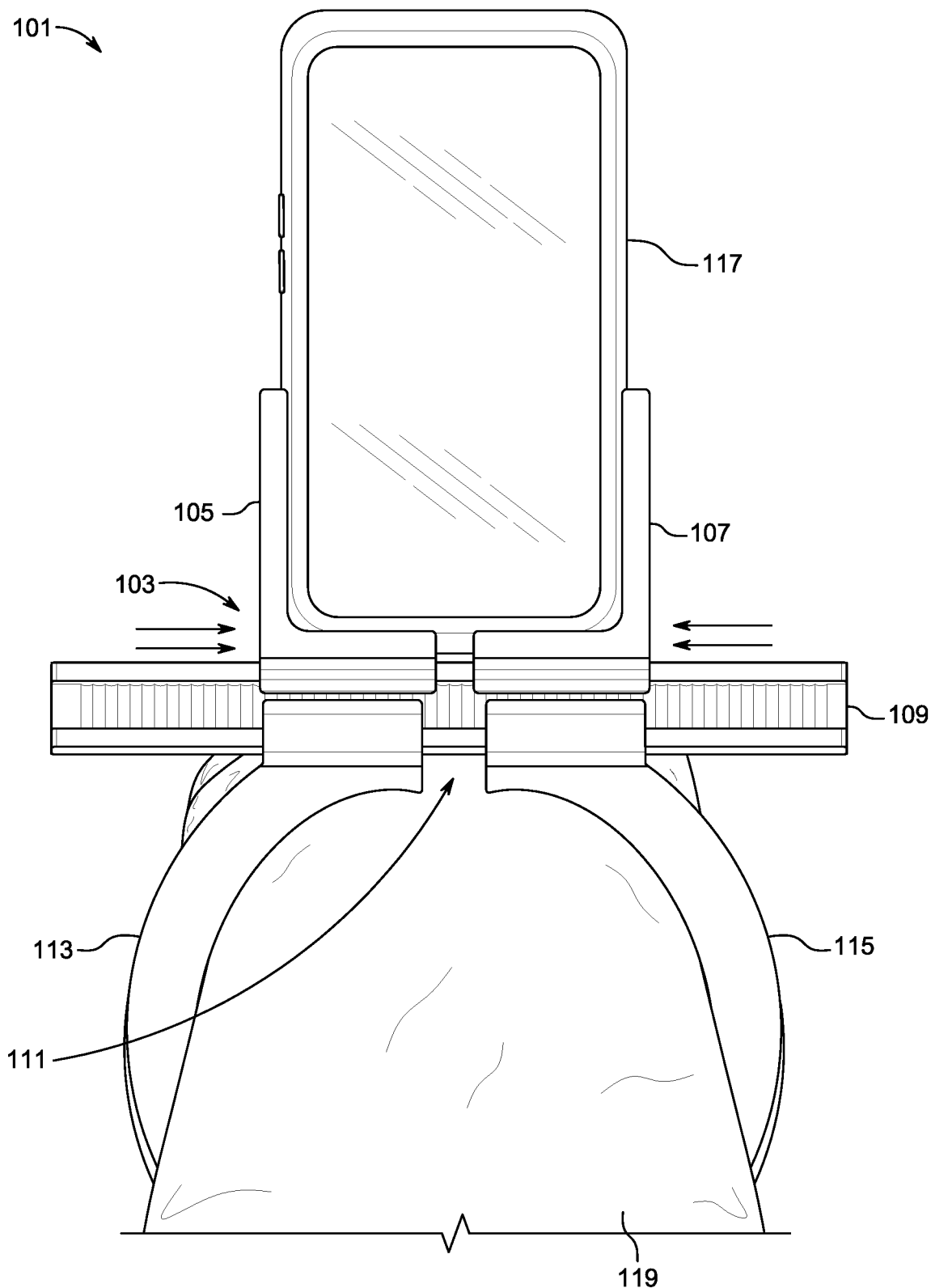
FIG. 1B is a front view of a mobile phone holder mounted on an appendage in accordance with a preferred embodiment of the present invention that is retaining a mobile phone in a portrait orientation.

Referring now to the drawings wherein like reference characters identify corresponding or similar elements throughout the several views, FIGS. 1A-1B depict a front view of a mobile phone holder 101 in accordance with a preferred embodiment of the present application. It will be appreciated that mobile phone holder 101 overcomes one or more of the above-listed problems commonly associated with conventional mobile phone holders.

In the contemplated embodiment, the mobile phone holder 101 includes a cradle 103 having a first arm 105 and a second arm 107; an elongated member 109; and a supporter 111 having a first curved member 113 and a second curved member 115. It should be appreciated that the mobile phone holder 101 may vary based on aesthetical, functional, or manufacturing considerations.

The cradle 103 is configured to removably secure a mobile phone 117 therein. The cradle 103 may position the mobile phone 117 in a landscape orientation (see FIG. 1A) and a portrait orientation (see FIG. 1B) by sliding the arms 105, 107 along the elongated member 109, as shown with directional arrows. It should be appreciated that the cradle 103 may accommodate any mobile phone of varying shapes and sizes.

The elongated member 109 is configured to engage with the cradle 103 thereon. In some embodiments, it should be appreciated that the elongated member 109 may be integrally formed as part of the cradle 103 or it may be separately formed and engaged therewith (e.g., by adhesives or cements; by welding, brazing, soldering, or other fusing techniques; by friction techniques; by mechanical connectors; etc.). Similarly, in alternative embodiments, the elongated member 109 may be integrally formed as part of the supporter 111 or it may be separately formed and engaged therewith (e.g., by adhesives or cements; by welding, brazing, soldering, or other fusing techniques; by friction techniques; by mechanical connectors; etc.).

The supporter 111 is configured to mount on an appendage 119. It should be appreciated that the appendage 119 may include a limb of a user such as his or her knee, an arm of a chair, and any other member having a curved surface. Additionally, it should be appreciated that the supporter 111 may accommodate to any appendage of varying shapes and sizes.

In addition, it should also be appreciated that the mobile phone holder 101 may be constructed from any suitable or desired material including, without limitation, metal materials, polymer materials, rubber materials, plant-based materials, combinations of various materials, and the like.

Further, it should be appreciated that one of the unique features believed characteristic of the present application is the configuration of the supporter 111 that enables the user to view media content on a mobile phone handsfree.

Figure 2:
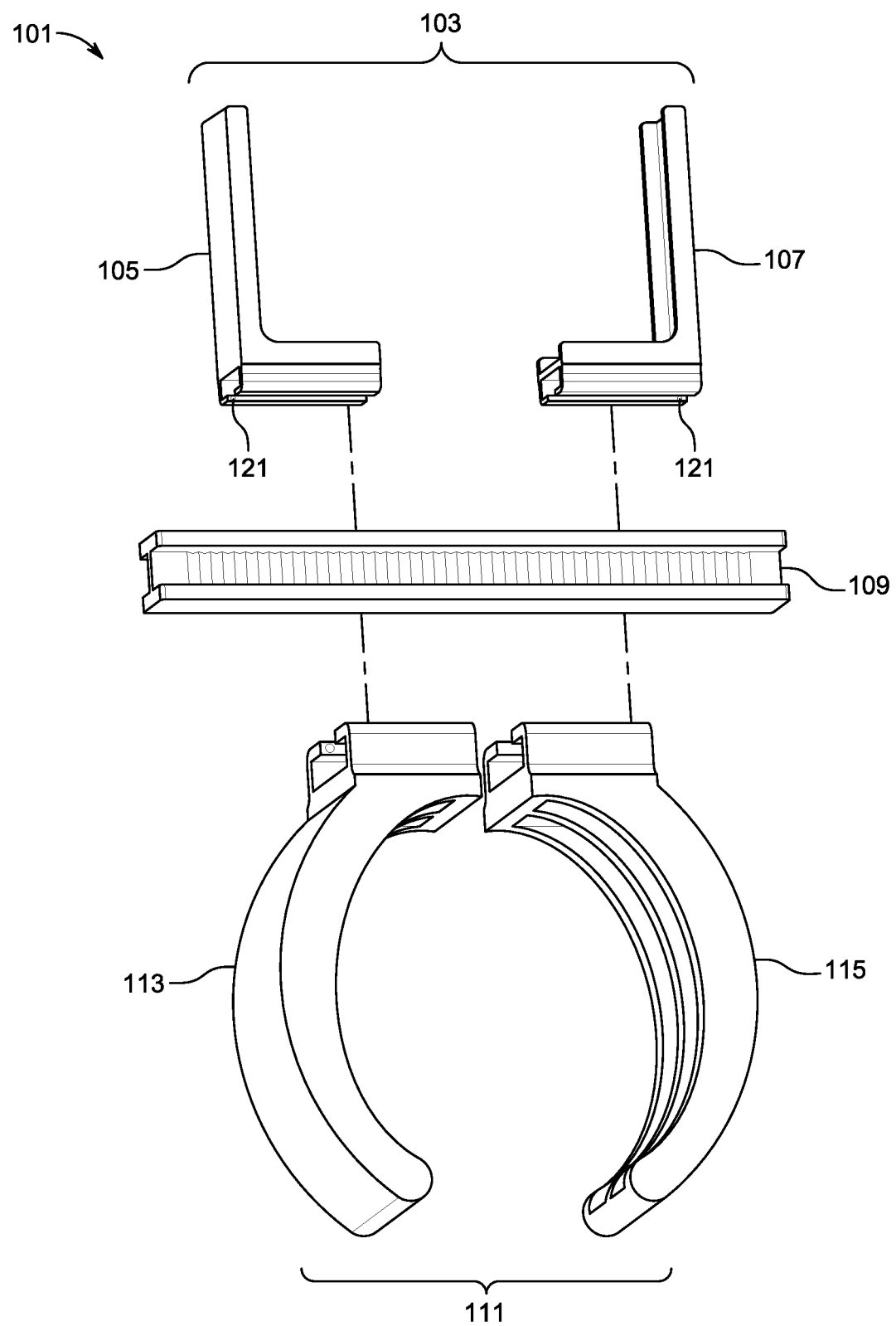
FIG. 2 is an exploded view of the mobile phone holder of FIGS. 1A and 1B.

In FIG. 2, an exploded view of the mobile phone holder 101 is depicted. As shown, the mobile phone holder 101 also includes one or more locking mechanisms 121 to provide further security the engagement of cradle segments 105, 107 with the elongated member 109.

Figure 3:
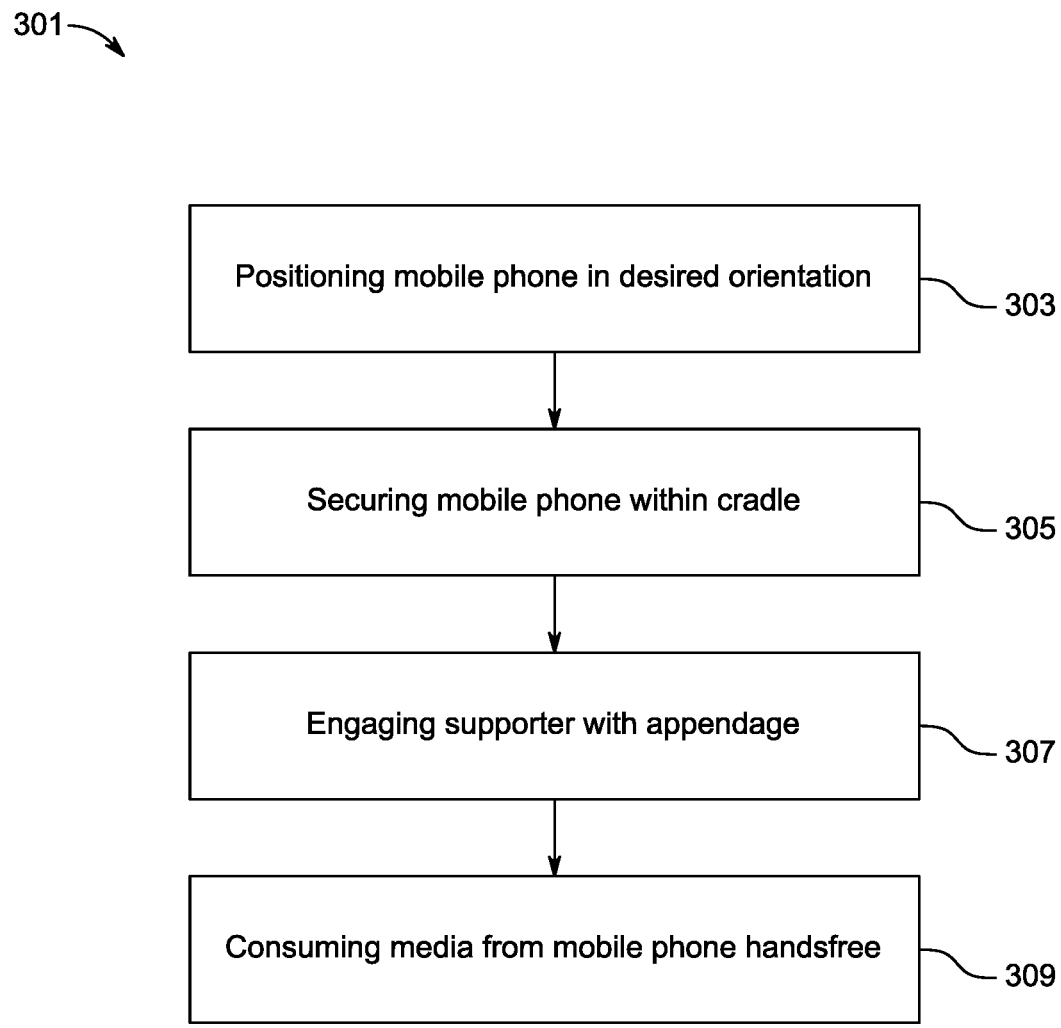
FIG. 3 is a flowchart of a method of use of the mobile phone holder of FIGS. 1A and 1B.

In FIG. 3, a flowchart 301 depicts a simplified method of use associated with the mobile phone holder 101. During use, the user may position a mobile phone in the desired orientation, as shown with box 303. The user may then secure the mobile phone within the cradle, as shown with box 305. Once the user engages the supporter with an appendage, the user may consume media from the mobile phone handsfree, as shown with boxes 307, 309.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mobile phone holder that mounts on an appendage, comprising:
   a cradle having a first arm and a second arm, the cradle configured to removably secure a mobile phone therein, the first arm forming an L-shaped configuration with a channel, the mobile phone slidingly engages with the channel;
   a locking mechanism secured to the first arm;
   an elongated member configured to engage with the cradle via the locking mechanism, the locking mechanism slidingly engages with the elongated member and locks to the elongated member in a fixed position, which in turn causes the first arm to remain in a stationary position relative to the second arm, the first arm slides along the elongated member independent of the second arm;
   wherein both the first arm and the second arm slidingly engage on the elongated member independent of each other;
   a supporter having a first curved member and a second curved member, the supporter engaged with the elongated member, the supporter configured to mount on an appendage, the first curved member forming a first channel that slidingly engages with the elongated member, the first curved member and the second curved member slidingly engage on the elongated member independent of each other.

* * * * *